June 2, 1925. 1,540,067
R. H. GRIMORD ET AL
TRACTION BELT ATTACHMENT FOR AUTOMOBILES
Filed April 14, 1924
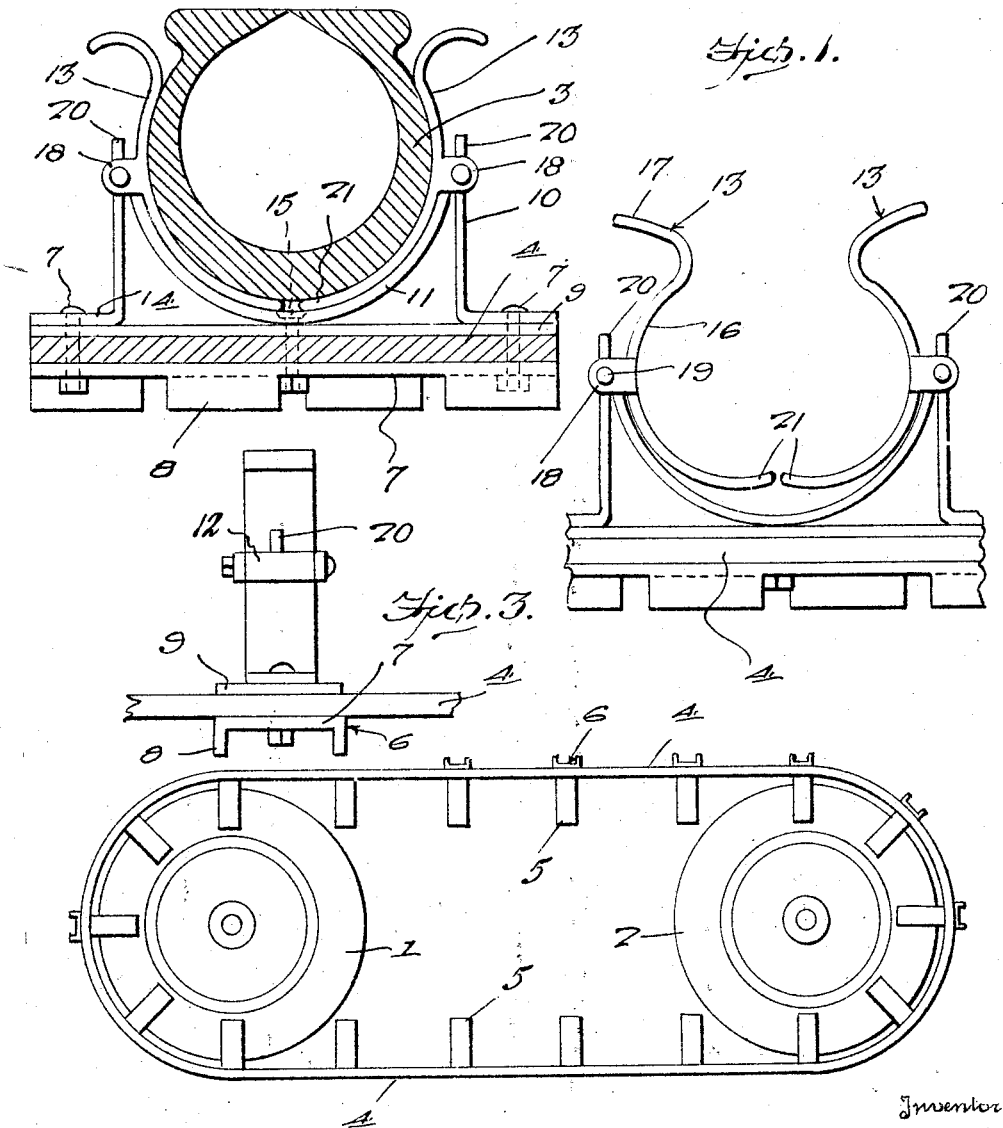

Patented June 2, 1925.

1,540,067

UNITED STATES PATENT OFFICE.

ROY H. GRIMORD AND EDGAR H. GREMORE, OF HOMESTEAD, WISCONSIN.

TRACTION-BELT ATTACHMENT FOR AUTOMOBILES.

Application filed April 14, 1924. Serial No. 706,495.

*To all whom it may concern:*

Be it known that we, ROY H. GRIMORD and EDGAR H. GREMORE, citizens of the United States, residing at Homestead, in the county of Florence and State of Wisconsin, have invented certain new and useful Improvements in Traction-Belt Attachments for Automobiles, of which the following is a specification.

This invention relates to traction belt attachments for automobiles, and particularly to a device of this character for adapting an automobile for travel on the surface of snow.

An object of the invention resides in providing an endless belt for each side of the automobile, adapted for fitting over the front and rear wheels at each side thereof, carrying means adapted to engage the wheels for guiding the belt and securing the same for operative relation in connection with the wheel and providing a means for delivering traction to the belt from the drive wheels of the automobile.

Another object of the invention resides in providing endless belts for each side of an automobile adapted to fit over the front and rear wheels respectively having resilient gripping means carried thereby adapted to grip the tires on the wheel for mounting the belt in operative relation thereto, and providing a traction receiving device, for cooperation with the drive wheels of the vehicle to transmit the traction thereof to the belt for driving said belt and the vehicle over the surface of snow.

A further object of the invention resides in providing endless belts adapted to be fitted over the front and rear wheels at each side of a motor vehicle for adapting the vehicle to travel on the surface of the snow, which are provided with a plurality of gripping devices arranged in spaced relation throughout the length of the belt, and on the inner side thereof adapted to frictionally grip the wheels of the vehicle and transmit the traction from the drive wheels to the belt, for applying the driving power of the said wheels thereto, said members being of such character that they will readily release their frictional grip on the wheels for permitting the travel of the belt from one wheel to the other.

The invention includes other objects and improvements in the construction and arrangement of the parts for carrying out the invention, which are more particularly described in the following description, directed to a preferred form of the invention, it being understood, however, that variations may be made in the form and construction and arrangement of these parts, without departing from the spirit and scope of the invention as described and claimed.

In the drawing forming a part of this application:

Figure 1 is a sectional view through a portion of the belt, showing one of the gripping members in its normal position, ready to grip a wheel.

Figure 2 is a sectional view, similar to Figure 1, showing one of the gripping members in gripping relation, in connection with the tire of a motor vehicle.

Figure 3 is a detail side elevational view of a portion of the belt, and one of the gripping members.

Figure 4 is a diagrammatic view showing the manner of mounting the belt on the front and rear wheels of the vehicle for effecting the traction on snow.

1 indicates the front wheel, and 2 the rear wheel of a motor vehicle of any suitable character, equipped with pneumatic tires or the like, as indicated at 3. Endless traction belts are adapted to be applied over the front and rear wheels 1 and 2 respectively of the vehicle, at each side thereof, in the manner illustrated clearly in Figure 4, which belts are indicated generally at 4, and are substantially wide in cross section, in order to present a large bearing surface to the snow. Each traction belt 4 is provided with a plurality of gripping members indicated generally at 5, on the inside of the belt, and on the outside thereof with a plurality of traction cleats indicated at 6, which are secured to said belts by bolts 7 and 15, in a manner clearly illustrated in the drawings. The traction cleats 6 are formed of bar members having base portions 7 adapted to seat against the face of the belt and provided with lateral projections 8 arranged in spaced relation and extending from each side of the base 7, in a manner clearly illustrated in Figures 2 and 3 of the drawing, to provide a firm grip on the surface of snow, ice or the like, so that the vehicle will be prevented from skidding, and positive traction will be provided.

On the inner face of the belt opposite each cleat 6 is mounted a bar member 9, and which provides a seat for the supporting bracket 10 formed with a curved central portion 11 terminating at 12 in bearings for pivotally mounting in opposed relation, a pair of cooperating similarly constructed gripping jaws 13. The outer ends of the bracket members 10 are extended into contact with the bar member 9, and have outwardly extended end portions 14 seating against said bar member, and provided with openings for receiving the bolts 7 which extend through the ends of the bracket member 10, the bar member 9, the belt, and the base 7 of the cleat 6 for receiving suitable nuts to secure the said parts in rigid relation on the belt. The central portion of the curved part 11 of the bracket member receives a bolt 15, which also extends through the bar member, the belt 4, and the base 7 of the cleat 6, for receiving a suitable nut, screw threaded thereon to additionally secure said members in rigid relation in connection with the belt.

Each of the gripping members 13 are formed of resilient strips of material, having a major curved portion indicated generally at 16, and a minor curved portion at 17, the central portion of the strip being provided with ears 18 adapted to extend over the ends of the bearings 12 of the bracket 10 for receiving pivot pins 19, through suitable openings formed in said ears for pivotally mounting said gripping members 13 to said bearings 12 for cooperating in gripping the tire 3 in the manner illustrated in Figure 2. A stop 20 is provided on each bearing 12, and extending outwardly therefrom, in order to prevent the gripping members from moving beyond a cooperative position for gripping the tires.

It will be noted from the drawings, and particularly Figure 1, that the major portion 16 of each gripping member normally maintains a curve substantially smaller than the central portion of the bracket 11, so that the ends 21 of each gripping member extend upwardly in a substantially spaced relation with respect to the bottom portion of the curved part 11 of the bracket 10, and the juncture between the major curved portion and the minor curved portion of one gripping member is directed toward the similar portion of the other member for normally decreasing the space between the juncture portions of said members, the ends of the minor curved portions of each gripping member being directed outwardly relative to the belt.

It will thus be seen from this structure that the opening between the juncture of the minor curved portion of each gripping member, with the major curved portions thereof is substantially less than the width of the tire 3, so that when the belt passes over said wheels, the gripping members will successively ride into engagement with the tires 3 of each wheel, which will force the gripping members outwardly against their normal resilient action, and the tread of the tires will ride into the major curved portions of said gripping members and engage the ends 21 thereof and force them downwardly relatively to each other, and into substantial contact with the curved portion 11, so that the weight of the vehicle will be effectively supported by the belt and the gripping members, and the resiliency thereof will effect a firm gripping of the tire, in order that the traction from the rear wheels of the vehicle may be transmitted to the belt for driving the vehicle over the belt and surface of snow or the like.

It will therefore be clear that an exceedingly simple form of traction device has been provided for wheeled motor vehicles which will adapt the vehicle to travel over snow, and which will efficiently transmit the traction of the driving wheels of the vehicle to the attachment, while at the same time providing a positive connection with the wheels of the vehicle.

What is claimed is:

1. A traction attachment for wheel vehicles including an endless belt adapted for mounting on the front and rear wheels of the vehicle, and a plurality of gripping members mounted on said belt in spaced relation having resilient gripping means for engaging the wheels of the vehicle to mount said belt thereon and transmit the traction from the driving wheels to said belt.

2. A traction belt attachment for automobiles including an endless belt adapted to be positioned over the front and rear wheels of the vehicle for travel therebetween, a plurality of bracket members mounted in spaced relation on the inside of said belt, cooperating resilient gripping members carried by said bracket members for gripping engagement with the wheels of the automobile to mount the belt thereon and transmit the traction of the drive wheels of the automobile thereto, a plurality of cleats mounted in spaced relation on the outer surface of the belt, and securing means adapted to secure the respective cleats and brackets to the belt.

In testimony whereof we affix our signatures.

ROY GRIMORD.
EDGAR H. GREMORE.